United States Patent
Ganapam et al.

(10) Patent No.: US 7,987,193 B2
(45) Date of Patent: Jul. 26, 2011

(54) SYSTEM AND METHOD FOR SETTING STATUS FLAGS FOR MOBILE DATA DISTRIBUTION BASED ON DISTRIBUTION RULES

(75) Inventors: Ashok Ganapam, Andhra Pradesh (IN); Ramprasadh Kothandaraman, Karnataka (IN); Ankur Bhatt, New Delhi (IN); Hans-Martin Ludwig, Wiesloch (DE)

(73) Assignee: SAP AG, Walldorf (DE)

( * ) Notice: Subject to any disclaimer, the term of this patent is extended or adjusted under 35 U.S.C. 154(b) by 995 days.

(21) Appl. No.: 11/770,739

(22) Filed: Jun. 29, 2007

(65) Prior Publication Data

US 2009/0005065 A1 Jan. 1, 2009

(51) Int. Cl.
*G06F 7/00* (2006.01)
*G06F 17/30* (2006.01)
(52) U.S. Cl. .................................................. 707/754
(58) Field of Classification Search .................. None
See application file for complete search history.

(56) References Cited

U.S. PATENT DOCUMENTS

| | | | |
|---|---|---|---|
| 6,324,587 B1 * | 11/2001 | Trenbeath et al. | 719/310 |
| 2003/0126137 A1 * | 7/2003 | McFadden | 707/100 |
| 2004/0157582 A1 * | 8/2004 | Peglion et al. | 455/403 |
| 2004/0162853 A1 * | 8/2004 | Brodersen et al. | 707/104.1 |
| 2005/0027811 A1 * | 2/2005 | Kraft | 709/207 |

OTHER PUBLICATIONS

Plagemann et al, "Towards Middleware Services for Mobile Ad-hoc Network Applications", FTDCS 2003, 7 pages.*

* cited by examiner

*Primary Examiner* — Uyen T. Le

(57) ABSTRACT

Embodiments of the invention are generally directed to systems and methods for setting status flags for mobile data distribution based on the subscription rules. A mobile middleware manages several objects between the mobile device and the backend system. The mobile data distribution happen based on subscription rules set up on the object. A status flag is assigned to each such subscription rule and any change in the subscription rule triggers updating of that corresponding status flag. The mobile middleware distributes data to the backend system and to the mobile devices based on the subscription rule evaluation. For updating the subscription rule, it is sufficient to evaluate only the status flags that have changed.

20 Claims, 9 Drawing Sheets

Table A

Table B

| Row | Order | Device | City | Priority |
|---|---|---|---|---|
| 1 | Order1 | Device2 | 1 | 1 |
| 2 | Order1 | Device3 | 0 | 1 |

TABLE (A) AT TIME T=T(1)

| Row | Order | Device | City | Priority |
|---|---|---|---|---|
| 1 | Order1 | Device2 | 1 | 0 |
| 2 | Order1 | Device3 | 0 | 0 |

TABLE (A) AT TIME T=T(2)

FIGURE 5

| Order | Device | Rules | Dependencies |
|-------|--------|-------|--------------|
| Order1 | Device2 | 10 | 010 |

610 — header row
615 — Order1
620 — Device2
625 — Rules value
630 — Dependencies value

SYSTEM AND METHOD FOR SETTING STATUS FLAGS FOR MOBILE DATA DISTRIBUTION BASED ON DISTRIBUTION RULES

FIELD OF THE INVENTION

The invention relates to the field of data processing systems and, more particularly to systems and methods for managing mobile data distribution.

BACKGROUND OF THE INVENTION

In a mobile business world, a mobile business application running on a mobile device connects to a backend system or to a server application, through mobile middleware. The mobile middleware enables data synchronization between the mobile devices and ensures consistency with the data in the backend system. The mobile middleware assists the application integration needs of the mobile devices in general and of any offline applications, in particular.

In a typical mobile business application environment, the mobile middleware distributes data from the different backend systems to multiple mobile devices. The data distributed above is encapsulated in the form of an object. And the object is distributed to the mobile devices. Each of these mobile devices requires only a part of the data. The objects are distributed to the mobile devices based on business rules and business dependencies. In the conventional technology, each object instance is evaluated with respect to the rules and the dependencies and then distributed to the mobile devices identified based on the evaluation. The evaluation is done for each object instance whereby per mobile device an action such as send insert, send update, send deletion is determined. In the current mobile middleware technology, when a field of the object instance is changed, it is required to evaluate every rule for the object in order to identify the mobile devices to which the object instance has to be distributed.

There is a need for systems and methods that can evaluate the rules and the dependencies between objects in order to get a list of the mobile devices to which the object instance should be distributed. There is a further need for a system and method that can provide an updated table for distributing the object instances to the mobile devices based on the evaluated distribution rules.

SUMMARY OF THE INVENTION

Embodiments of the invention are generally directed to systems and methods for setting status flags for mobile data distribution based on the subscription rules. A mobile middleware manages several objects between the mobile device and the backend system. The mobile data distribution happens based on subscription rules set up on the object. A status flag is assigned to each such subscription rule and any change in the subscription rule triggers updating of that corresponding status flag. The mobile middleware distributes data to the backend system and to the mobile devices based on the subscription rule evaluation. For updating the subscription rule, it is sufficient to evaluate only the status flags that have changed.

BRIEF DESCRIPTION OF THE DRAWINGS

Embodiments of the invention are illustrated by way of example, and not by way of limitation, in the figures of the accompanying drawings in which like reference numerals refer to similar elements.

FIG. 5 shows two tables illustrating an example relationship between an object and the subscription rules for assigning a status flag to a subscription rule.

FIG. 6 shows a table illustrating an example relationship between the objects and the subscription rules for updating an association table.

DETAILED DESCRIPTION

Embodiments of the invention are generally directed to a system and method for setting status flags for mobile data distribution based on the subscription rules. A mobile middleware manages several objects between the mobile device and the backend system. The mobile data distribution happens based on subscription rules set up on the object. A status flag is assigned to each such subscription rule and any change in the subscription rule triggers updating of that corresponding status flag. The mobile middleware distributes data to the backend system and to the mobile devices based on the subscription rule evaluation. For updating the subscription rule, it is sufficient to evaluate only the status flags that have changed.

Figure 1:
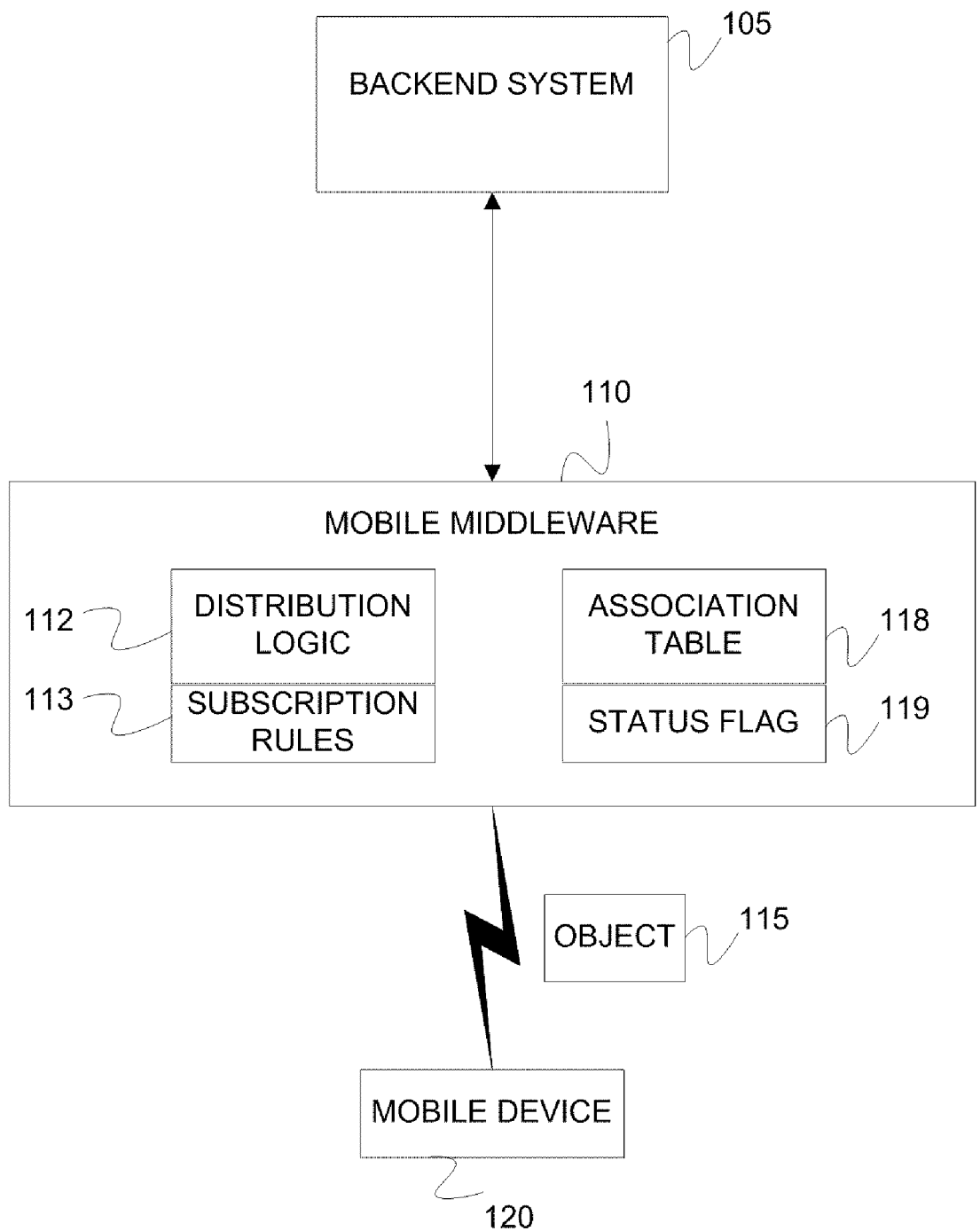
FIG. 1 is a block diagram illustrating the working of a mobile application using a mobile middleware, according to an embodiment of the invention.

FIG. 1 is a block diagram illustrating the working of a mobile application using a mobile middleware, according to an embodiment of the invention. A mobile middleware 110 is connected to the backend system 105 and to the mobile device 120. The backend system 105 is a source of information and is connected to the mobile middleware 110. Examples of such backend systems are SAP® R/3, Legacy transaction processing system, CCE tour planning system, Seibel® customer relationship management (CRM), Peoplesoft® CRM, Oracle® Apps. The mobile device 120 belongs to a user or a set of users, and only a part of the data in the backend system 105 is required by a single mobile device. The mobile middleware 110 keeps the mobile device 120 consistent and up-to-date using the distribution logic 112. The mobile middleware 110 ensures that all incoming objects from the backend system 105 are distributed to the appropriate mobile device 120 and replicated in the mobile middleware 110. According to an embodiment of the invention, an object 115 is used to transfer the data between the mobile middleware 110 and the mobile device 120. The object 115 is a basic entity over which the distribution logic 112 is defined in the mobile middleware 110. The distribution logic 112 is controlled by the subscription rules 113. An operation such as Create, Retrieve, Update and Delete (CRUD) may be performed on the object 115, either at the back-end system 105 or on mobile devices 120 and then sent to the mobile middleware 110. The distribution logic 112 is set up on the object 115 based on the subscription rules 113 and an instance of the object 115 is distributed to the mobile devices 120. The mobile middleware 110 evaluates the mobile devices for every incoming object instance 115 based on the subscription rules 113. When the subscription rules 113 are changed the mobile devices 120 are evaluated for the existing object 115 and the object 115 may be required to perform an operation on the mobile devices 120. The information of the object instance 115 and the corresponding mobile device 120 is stored in an association table 118 as a status flag 119. The mobile device 120 is a semi-online or offline device and hence the object 115 may not be transmitted to the mobile device 120 immediately. It is therefore necessary to store the status flag 119 for the object 115 corresponding to each mobile device 120. The association table 118 stores the status flag 119. When a mobile device 120 connects to the mobile middleware 110 using the status flag 119 provided from the association table 118, the object 115 is sent from the mobile middleware 110 to the identified mobile device 120.

Figure 2:
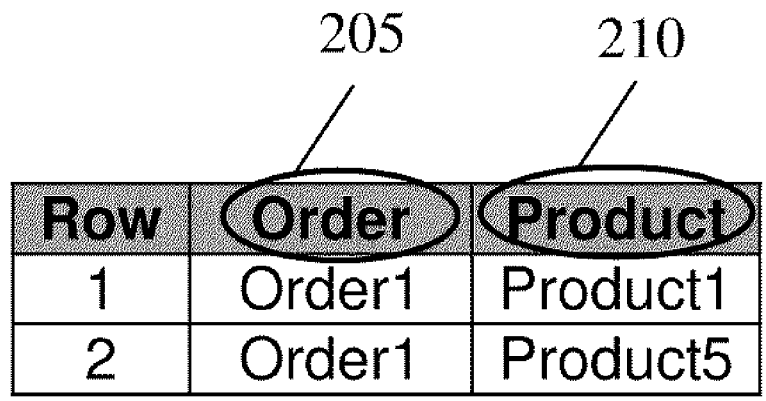
FIG. 2 shows two tables illustrating an example relationship between objects.
Figure 2:
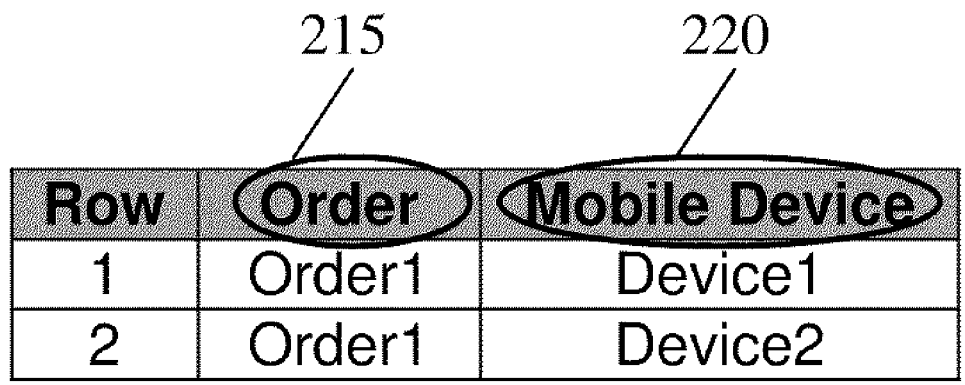

FIG. 2 shows two tables illustrating an example relationship between objects such as an order 205, a product 210 and the mobile device 215. The subscription rule is either a direct rule or a dependency. The direct rule describes which object instances are to be sent to which set of mobile devices. The dependency defines a relationship between two objects where one object is linked to another object and the change in one object affects the other linked object. For example, consider a dependency between objects 'Order' 205 and 'Product' 210 where 'Product' 210 is linked to 'Order' 205. The object that is linked to is referred to as a 'child' and followed object is referred to as a 'parent'. The information of which parent object instance is linked to which child object instance is maintained either with the parent object instance or with the child object instance. As depicted in FIG. 2 Table A, during runtime an instance of object column order 205 in row 1 under column order 'Order1' contains multiple products such as 'Product1' on which the order is taken. The row 1 contains 'Order1' and 'Product1' and the row 2 contains 'Order1' and 'Product5'. All the products 'product1' and 'product5' on which the information that are referred to in the order 'Order1' of row 1 and row 2 should be distributed to those mobile device to which the column order 205 is to be distributed. The data transfer happens based on a set of subscription rules set up on an object. Each object instance is evaluated with respect to the subscription rules and the identified object instances such as order 215 are distributed to the mobile device 220 based on the evaluation. Whenever a relevant field of an object instance is changed, the subscription rules for the object are evaluated along with the set of mobile devices 220 to which the object instance has to be sent. As illustrated in Table B, in row 1 under the column order 'Order1' is to be distributed to mobile device 'Device1' and as in row 2 the order 'Order1' is to be distributed to mobile devices 'Device2'.

Figure 3:
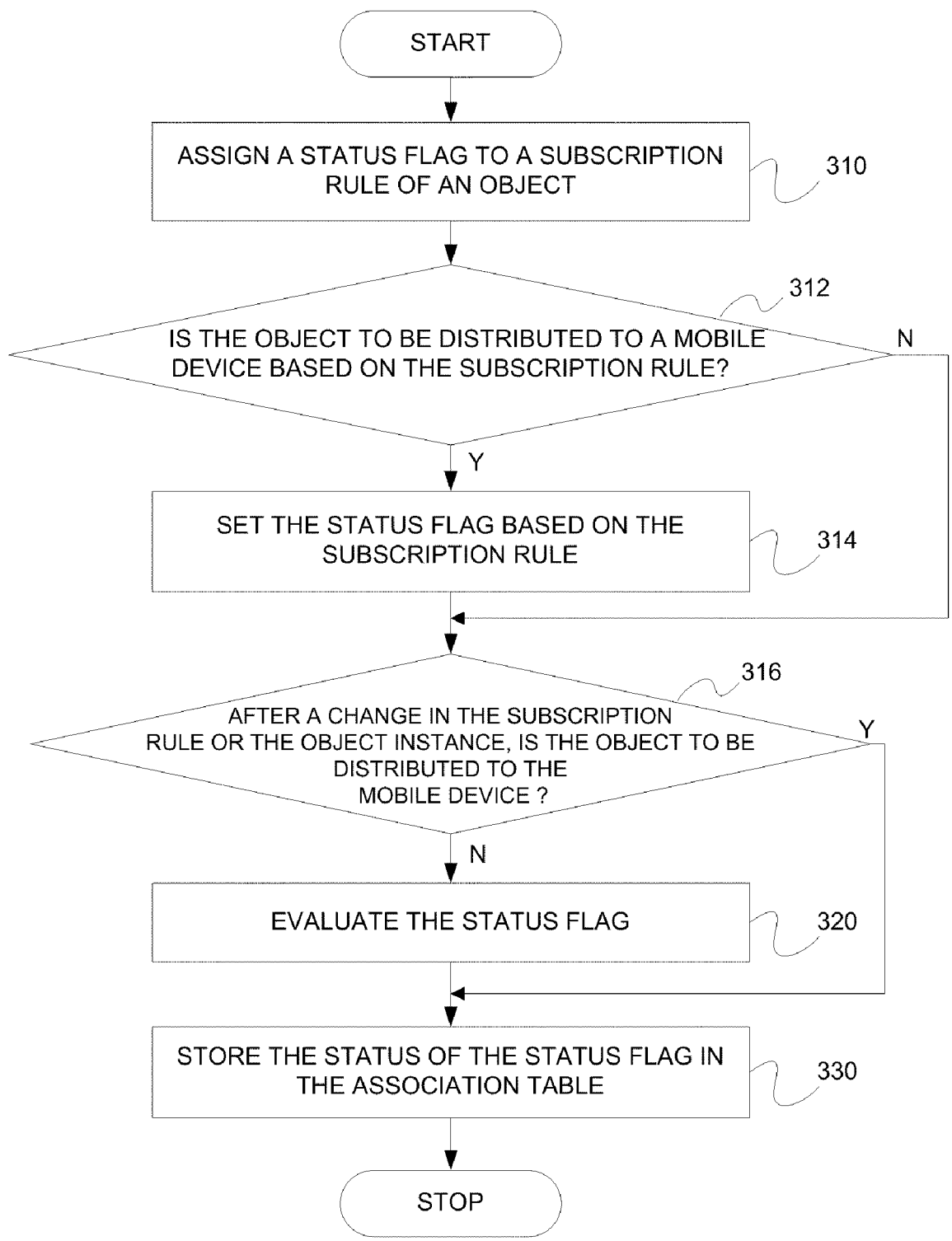
FIG. 3 is a flow diagram illustrating an example method for managing the distribution of mobile data.

FIG. 3 is a flow diagram illustrating an example method for managing the distribution of a mobile data based on subscription rules. The subscription rules can be direct rules or dependency rules or any combination thereof. In an embodiment of the invention, assign a status flag to a subscription rule of an object at 310 and if the object is to be distributed to the mobile device at 312 because of the subscription rule, the status flag is set at 314. Based on some change in the subscription rule or the object instance, if the object is no longer distributed to the mobile device at 316 then evaluate the status flag at 320. The status of the status flag is stored in an association table at 330. In one embodiment, the above steps 310 through 320 can be repetitively executed. In another embodiment, several status flags can be used for mobile data distribution. In other embodiment, multiple systems and methods can be employed to implement the invention.

Figure 4:
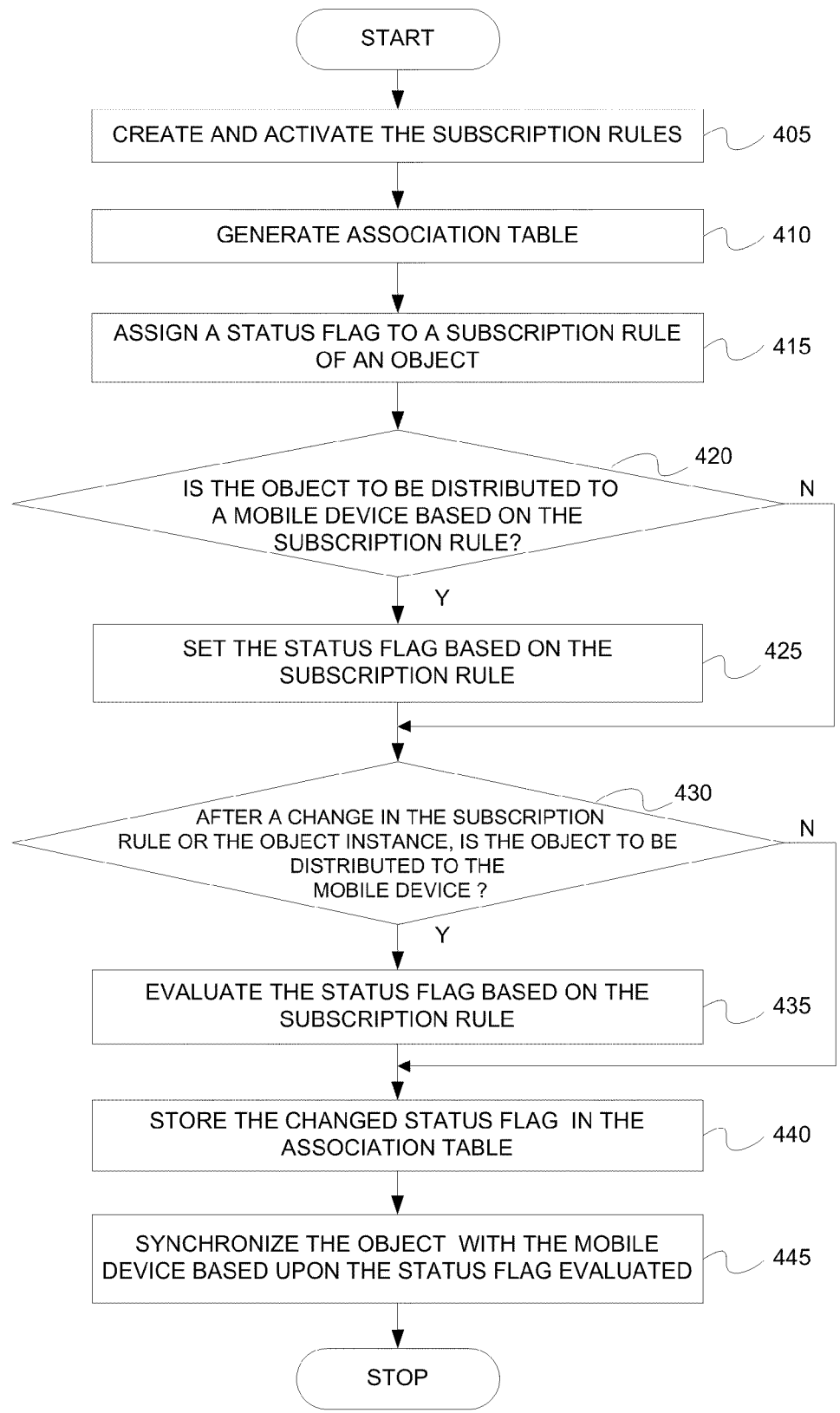
FIG. 4 is a flow diagram illustrating an example detailed method for managing the distribution of mobile data.

FIG. 4 is a flow diagram illustrating an example detailed method for managing the distribution of a mobile data. The subscription rules are created and activated at 405. For any object instance coming into the mobile middleware based on the subscription rules the association table are generated at 410. A status flag is assigned to each subscription rule of the object at 415. Set the status flag at 425 if the object is to be distributed to the mobile device at 420 based on the subscription rules. Evaluate the status flag at 435 according to the subscription rule set up on the incoming object if the object is no longer to be distributed to the mobile device at 430. The status of the status flag is obtained as the outcome of the status flag evaluation and is stored in the association table at 440. Based upon the evaluated status flag stored in the association table at 435, the object is synchronized with the mobile device at 445. In an embodiment, the steps at 405 through step at 415 can be performed during design time. In another embodiment, the steps at 420 through step at 440 can be performed during runtime.

FIG. 5 shows two tables illustrating an example relationship between an object and the subscription rules for assigning a status flag to a subscription rule. In the association table the relationship is stored as illustrated in FIG. 5, Table (A) at time T=T1, as in Row1 500 the order 'Order1' is to be distributed to a device 'Device2' and as in Row2 505 the order 'Order1' is to be distributed to a device 'Device 3' based on the subscription rules. Examples of such subscription rules ('City' and 'Priority') are as depicted. In the accompanying tables, assume high priority is assigned '1' and low priority is assigned '0'. If the priority 510 of 'Order1' is changed from '1' as in Table (A) at t=t1 at 510 to priority '0' 530 as in Table (B) at time T=T2, the priority status flag 510 has to be evaluated again. Based on this evaluation, the subscription rule which had been matching for device . . . (status '1') is found to be no longer matching as the status is changed to '0'. After evaluation, based on the subscription rule 'City' that is matching, 515 the 'Order1' of Row1 is distributed to 'Device2', whereas as all the status flags ('City' and 'Priority') corresponding to 'Device3' of Row2 520 are 0s now therefore the 'Order1' will be deleted from the 'Device3' 540. In another embodiment, the priority status flag 510 may represent a state of the object based on the subscription rule.

FIG. 6 shows a table illustrating an example relationship between the objects and the subscription rules for updating the association table. According to an embodiment of the invention, as illustrated the Association Table for the object 'Order', maintains a corresponding entry for the device 'Device' and the status information according to a subscription rule. The subscription rule can be a combination of direct rules called 'Rules' or dependency rules called 'Dependencies'. A status flag can be assigned for each Rule and for each Dependency. For example, a first bit of the 'Rules' Rule1 625 is to distribute order 'Order1' 615 to mobile device 'Device2' 620. Similarly the second bit of 'Rules' Rule2 is to distribute 'Order1' to 'Device1'. Based on the subscription rules, the mobile middleware evaluates only those objects where the relationships have changed. The status flags for the rules and dependencies are stored in the association table. Based on the evaluation, FIG. 6 is an association table where in the 'Order1' 615 is distributed to the 'Device2' 620 because of the 'Rules' Rule1 625 set in the association table and the 'Dependency' Dependency2 630 set in the association table. If the 'Rules' Rule1 becomes invalid, then the mobile middleware will evaluate only the other dependencies and the distribution logic will be based by referring to the status flag of the association table.

Figure 7:
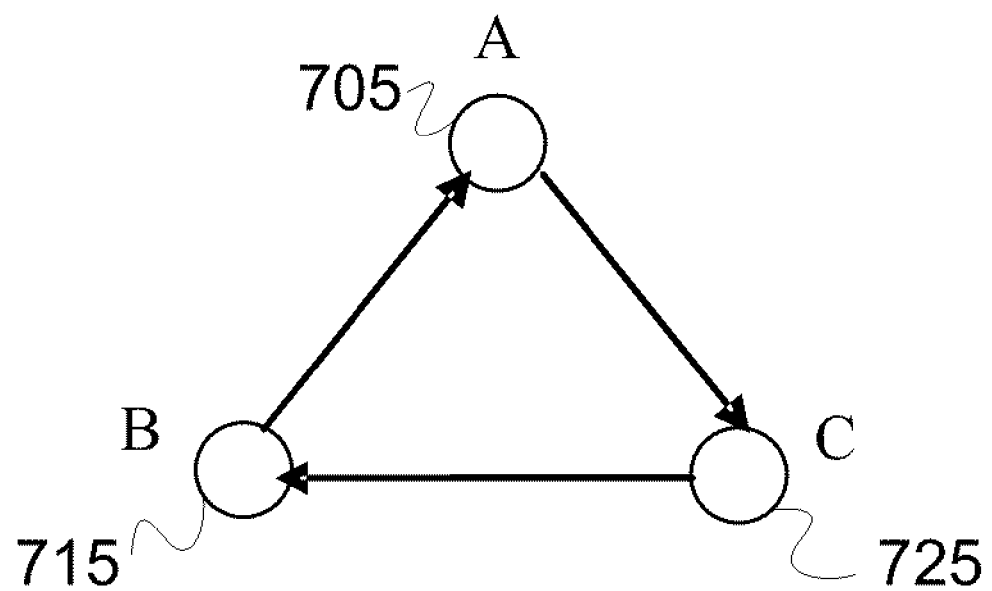
FIG. 7 is a state diagram illustrating an embodiment of the invention for distributing an object having a cyclic dependency.

FIG. 7 is a state diagram illustrating an embodiment of the invention for distributing an object having a cyclic dependency. A cyclic dependency is a dependency where an object can be reached again by traversing through its dependent objects. This route of traverse forms a cycle. For example as illustrated in FIG. 7, one sees a cycle formation of the objects A 705, B 715 and C 725 wherein B 715 follows A 705; C 725 follows B 715; and C 725 follows A 705. Hence effectively A 705 follows A 705. For example, the BACB cycle describes the dependency cycle for object B 715. Similarly the CBAC cycle and ACBA cycle describes the dependency for object C 725 and A 705 respectively. Due to this cyclic behavior of the object, the dependencies in the association table keeps on evaluating the status flag and is called the instance level cyclicity.

Figure 8:
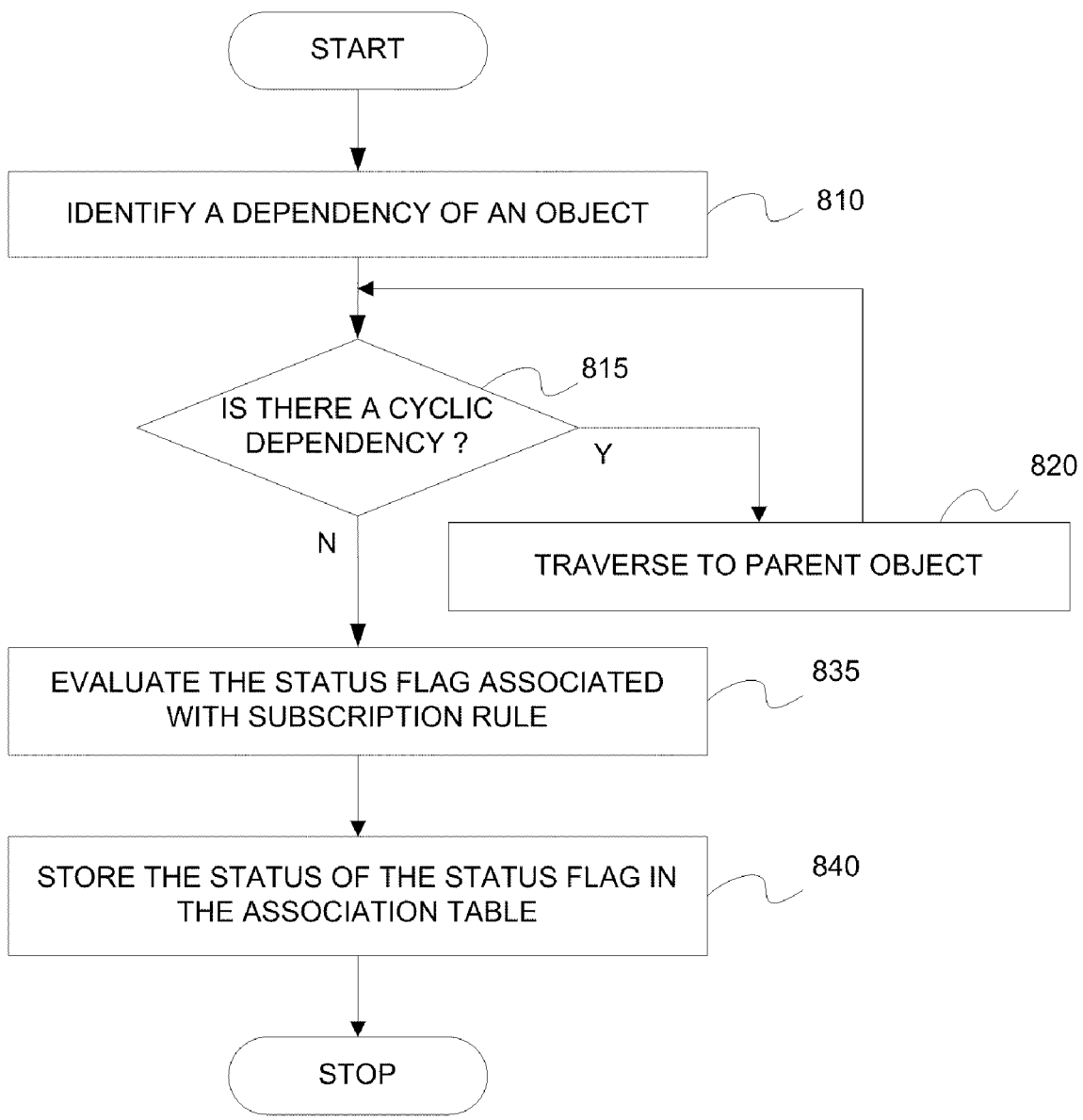
FIG. 8 is a flowchart diagram illustrating an example method for managing a cyclic dependency.

FIG. 8 is a flowchart diagram illustrating an example method for managing the cyclic dependency. The mobile middleware identifies; cyclic and non-cyclic dependencies. For non-cyclic dependencies the system continues the process as depicted in above FIG. 4. The dependencies of an object are identified by the mobile middleware at 810. The mobile middleware checks for cyclic dependency at 815 and in case of any identified cyclic dependency it traverses to the immediate parent objects at 820. This process is continued till the highest parent object is reached. At the parent object, the mobile middleware checks for cyclic dependency 815, if no cyclic dependency exists at 815 then the status flag associated with the subscription rules at 835 is evaluated. The status flag's status is stored in the association table at 840 based on the evaluation.

Figure 9:
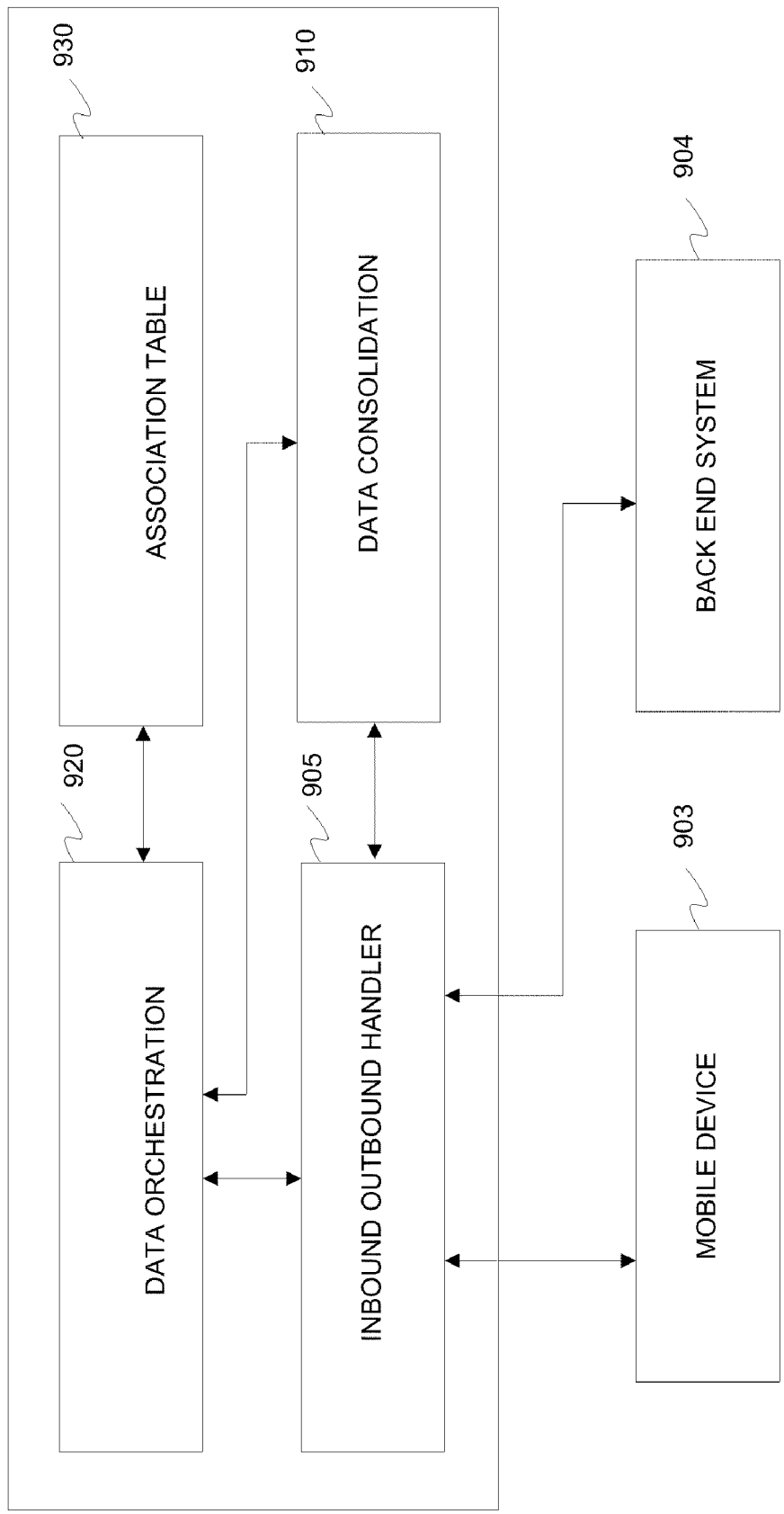
FIG. 9 is a system block diagram illustrating an example system for assigning status flags to the subscription rules.

FIG. 9 is a system block diagram illustrating an example system for assigning status flags to the subscription rules. The Inbound Outbound Handler 905 is responsible for distributing the object between the mobile device 903 and the backend system 904. The data consolidation module 910 stores the object coming in from the Inbound Outbound Handler 905. The data consolidation module 910 is responsible for feeding the object to the data orchestration module 920. The data orchestration module 920 is coupled to an association table 930. The association tables 930 are generated and configured at design time and they are used at runtime. The information of the status of the status flag is stored in the association table 930.

What is claimed is:

1. A computer implemented method for providing data distribution from a mobile middleware to a mobile device comprising:
    assigning a status flag to a field of an object;
    evaluating the status flag corresponding to the field of the object based on a subscription rule; and
    providing information of the status flag from the mobile middleware to the mobile device corresponding to the subscription rule.

2. The computer implemented method of claim 1, wherein the field comprises a set of fields.

3. The computer implemented method of claim 1, wherein the field comprises a rule.

4. The computer implemented method of claim 1, wherein the field comprises a dependency.

5. The computer implemented method of claim 1, further comprising checking for cyclicity of the object.

6. The computer implemented method of claim 5, wherein checking for cyclicity comprises:
    traversing to a parent object; and
    checking for cyclicity within the parent object.

7. The computer implemented method of claim 5, further comprising storing the status flag in an association table corresponding to the object.

8. The computer implemented method of claim 1, wherein the status flag comprises a flag corresponding to a subscription rule.

9. A computer system for providing data distribution from a mobile middleware to a mobile device, the computer system comprising:
    a memory to store the mobile middleware; and
    a processor communicatively coupled to the memory, the processor configured to execute the mobile middleware, the mobile middleware electronically coupled to a backend system and to the mobile device, the mobile middleware having a status flag assigned to a field of an object, the mobile middleware comprising:
        a data consolidation module electronically coupled to an information provider, the information provider to provide an object to the data consolidation module;
        a data orchestration module electronically coupled to the association table, the data orchestration module to evaluate the status flag corresponding to the field of the object based on a subscription rule type; and
        an association table electronically coupled to the data orchestration module, the association table to associate a flag to a field of an object and to store the status flag.

10. The computer system of claim 9, further comprising:
    the mobile middleware electronically coupled to the backend system, the backend system providing the data; and
    the mobile device being in logical communication with the mobile middleware.

11. The computer system of claim 10, wherein the mobile device comprises a wireless mobile device.

12. The computer system of claim 9, wherein the mobile device is in logical communication with the mobile middleware using a wireless communication network.

13. An article of manufacture, comprising:
    a machine readable medium having instructions for causing the machine to execute a method comprising:
        assigning a status flag to a field of an object;
        evaluating the status flag corresponding to the field of the object based on a subscription rule; and
        providing information of the status flag from a mobile middleware to a mobile device corresponding to the subscription rule.

14. The article of manufacture of claim 13, wherein the field comprises a set of fields.

15. The article of manufacture of claim 13, wherein the field comprises a rule.

16. The article of manufacture of claim 13, wherein the field comprises a dependency.

17. The article of manufacture of claim 13, further comprising instructions which when executed by the machine causes the machine to:
    check for cyclicity of the object.

18. The article of manufacture of claim 17, wherein checking for cyclicity comprises:
    traversing to a parent object; and
    checking for cyclicity within the parent object.

19. The article of manufacture of claim 13, further comprising instructions which when executed by the machine causes the machine to:
    store the status flag in an association table corresponding to the object.

20. The article of manufacture of claim 13, wherein the status flag comprises a flag corresponding to a subscription rule.

\* \* \* \* \*